United States Patent
Hasegawa et al.

(10) Patent No.: US 9,056,995 B2
(45) Date of Patent: Jun. 16, 2015

(54) INKJET RECORDING INK SET AND INK CARTRIDGE, AND RECORDING DEVICE, IMAGE FORMING METHOD, AND IMAGE-FORMED ARTICLE USING SUCH INK SET

(75) Inventors: Shin Hasegawa, Shizuoka (JP); Minoru Hakiri, Shizuoka (JP); Hiroyuki Fushimi, Shizouka (JP); Mitsuru Naruse, Shizuoka (JP); Naoya Morohoshi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 13/513,745

(22) PCT Filed: Dec. 1, 2010

(86) PCT No.: PCT/JP2010/071938
§ 371 (c)(1),
(2), (4) Date: Jun. 4, 2012

(87) PCT Pub. No.: WO2011/068239
PCT Pub. Date: Jun. 9, 2011

(65) Prior Publication Data
US 2012/0242741 A1 Sep. 27, 2012

(30) Foreign Application Priority Data
Dec. 3, 2009 (JP) .................. 2009-275245

(51) Int. Cl.
| | | |
|---|---|---|
| B41J 2/21 | (2006.01) | |
| C09D 11/326 | (2014.01) | |
| C09D 11/40 | (2014.01) | |
| C09D 11/324 | (2014.01) | |
| C09D 11/38 | (2014.01) | |
| B41M 5/00 | (2006.01) | |

(52) U.S. Cl.
CPC .............. *C09D 11/326* (2013.01); *B41J 2/21* (2013.01); *C09D 11/40* (2013.01); *C09D 11/324* (2013.01); *C09D 11/38* (2013.01); *B41M 5/0023* (2013.01)

(58) Field of Classification Search
CPC .... C09D 11/324; C09D 11/326; C09D 11/38; C09D 11/32; C09D 11/322; C09D 11/40; B41J 2/17503; B41J 2/21; B41J 2/2107
USPC .................................... 347/95–100
See application file for complete search history.

(56) References Cited

U.S. PATENT DOCUMENTS

| | | |
|---|---|---|
| 6,387,168 B1 | 5/2002 | Koitabashi et al. |
| 6,435,677 B1 | 8/2002 | Koitabashi et al. |
| 6,786,959 B2 | 9/2004 | Hakiri et al. |
| 7,101,919 B2 | 9/2006 | Hasegawa et al. |
| 7,490,930 B2 | 2/2009 | Morohoshi et al. |
| 7,798,629 B2 | 9/2010 | Hakiri et al. |
| 7,815,301 B2 | 10/2010 | Hasegawa et al. |
| 7,892,340 B2 | 2/2011 | Namba et al. |
| 7,919,544 B2 | 4/2011 | Matsuyama et al. |
| 7,938,527 B2 | 5/2011 | Ohshima et al. |
| 8,083,342 B2 | 12/2011 | Morohoshi et al. |
| 8,096,651 B2 | 1/2012 | Ohshima et al. |
| 8,118,419 B2 | 2/2012 | Morohoshi et al. |
| 8,142,849 B2 | 3/2012 | Ohshima et al. |
| 8,173,227 B2 | 5/2012 | Morohoshi et al. |
| 2001/0035110 A1 | 11/2001 | Kato |
| 2002/0019458 A1 | 2/2002 | Hirasa et al. |
| 2003/0078320 A1 | 4/2003 | Yatake |
| 2005/0054751 A1 | 3/2005 | Namba et al. |
| 2006/0272543 A1 | 12/2006 | Hakiri et al. |
| 2007/0037901 A1 | 2/2007 | Kanaya et al. |
| 2007/0076075 A1* | 4/2007 | Schmid et al. ................. 347/102 |
| 2007/0197685 A1 | 8/2007 | Aruga et al. |
| 2007/0221078 A1 | 9/2007 | Namba et al. |
| 2008/0036830 A1 | 2/2008 | Natori et al. |
| 2009/0098312 A1 | 4/2009 | Goto et al. |
| 2009/0114121 A1 | 5/2009 | Morohoshi et al. |
| 2009/0130313 A1 | 5/2009 | Ohshima et al. |
| 2009/0186162 A1 | 7/2009 | Namba et al. |

(Continued)

FOREIGN PATENT DOCUMENTS

| | | |
|---|---|---|
| CN | 1916090 A | 2/2007 |
| CN | 101365761 A | 2/2009 |

(Continued)

OTHER PUBLICATIONS

Combined Chinese Office Action and Search Report issued Jan. 21, 2014 in Patent Application No. 2010800546519 (with English language translation).

(Continued)

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

An inkjet recording ink set, which contains at least: a black pigment ink; and a color pigment ink, wherein the black pigment ink contains a black pigment treated with an anionic surfactant, and a black pigment coated with a resinous polymer, and water, and the black pigment ink is a pigment dispersion liquid where the black pigment treated with the anionic surfactant and the black pigment coated with the resinous polymer are dispersed in the water, and wherein the color pigment ink contains a color pigment, a nonionic surfactant, and water, and the color pigment ink is a pigment dispersion liquid where the color pigment is dispersed in the water with assistance of the nonionic surfactant.

13 Claims, No Drawings

(56) References Cited

U.S. PATENT DOCUMENTS

| | | |
|---|---|---|
| 2009/0263632 A1 | 10/2009 | Kojima et al. |
| 2010/0196602 A1 | 8/2010 | Koyano et al. |
| 2010/0215855 A1 | 8/2010 | Morohoshi et al. |
| 2010/0277548 A1 | 11/2010 | Hakiri et al. |
| 2010/0302306 A1 | 12/2010 | Hasegawa et al. |
| 2010/0302326 A1 | 12/2010 | Morohoshi et al. |
| 2012/0062646 A1 | 3/2012 | Hasegawa et al. |
| 2012/0154492 A1 | 6/2012 | Hakiri et al. |
| 2013/0038660 A1 | 2/2013 | Hasegawa et al. |

FOREIGN PATENT DOCUMENTS

| | | | |
|---|---|---|---|
| CN | 101400750 A | 4/2009 | |
| JP | 10 140064 | 5/1998 | |
| JP | 2000 239589 | 9/2000 | |
| JP | 2001 10200 | 1/2001 | |
| JP | 2001-098194 A | 4/2001 | |
| JP | 2001 254039 | 9/2001 | |
| JP | 2002-226743 A | 8/2002 | |
| JP | 2002 0265833 | 9/2002 | |
| JP | 2003 096358 | 4/2003 | |
| JP | 2003 226827 | 8/2003 | |
| JP | 2004 091617 | 3/2004 | |
| JP | 2005 298806 | 10/2005 | |
| JP | 2008 213483 | 9/2008 | |
| JP | 2008 260926 | 10/2008 | |
| JP | 2009 132766 | 6/2009 | |
| WO | 02 26898 | 4/2002 | |
| WO | WO 2009/081998 A1 | 7/2009 | |
| WO | WO 2009 081998 A1 * | 7/2009 | ............. C09D 11/00 |
| WO | WO 2011/030880 A1 | 3/2011 | |
| WO | WO 2011/136037 A1 | 11/2011 | |

OTHER PUBLICATIONS

International Search Report issued on Jan. 25, 2011 in PCT/JP10/071938 filed on Dec. 1, 2010.
Extended European Search Report issued Sep. 3, 2014, in EP Application No. 10834686 filed Dec. 1, 2010.

* cited by examiner

INKJET RECORDING INK SET AND INK CARTRIDGE, AND RECORDING DEVICE, IMAGE FORMING METHOD, AND IMAGE-FORMED ARTICLE USING SUCH INK SET

TECHNICAL FIELD

The present invention relates to an inkjet recording ink set, and an ink cartridge, as well as a recording device, an image forming method and an image-formed article using such ink set.

BACKGROUND ART

An inkjet printing system has a low level of noise and low running cost, and can realize high-speed printing, easily downsize a device for use, and is easily applied for color printing. Because of these advantages, this system has been widely used in printers, photocopiers, and the like. Inks for use in such printers are usually selected under the consideration of the printing properties such as jetting performance, and fixing ability, and print qualities such as occurrences of blurring in an printed image, optical reflection density of the image, and coloring ability.

It has been widely known that inks can be roughly classified into two types, i.e. dye inks and pigment inks, depending on the coloring material contained in the ink. The pigment inks have excellent water resistance and light resistances compared to the dye inks and also have an advantage that printing of vivid and clear characters is possible. However, the pigment inks have downsides such that the pigment inks require longer time to be fixed onto a printing medium than the time required for fixing the dye inks, and the resulting fixed images formed by the pigment inks may not have sufficient abrasion resistance. Moreover, there is a tendency that the size of dots formed on a printing medium with the pigment ink jetted from a nozzle by one jetting operation becomes small.

A pigment contained in a pigment ink is generally stably dispersed in the ink by using mainly electric repulsive force of a polymer dispersing agent to break the intermolecular forces between pigment particles. Note that, these intermolecular forces cause aggregations of the pigment particles. For this reason, the polymer dispersing agent is preferably added to the ink depending on the amount of the pigment contained therein.

When such ink is jetted onto a piece of plain paper for printing using an inkjet recording system, the pigment particles contained therein are aggregated to each other along with penetration of the solvent (e.g. water) of the ink into the paper, and evaporation of the solvent to the air. As the behavior of the ink on the paper at this time, the aggregation force of the ink increases as the amount of the polymer dispersing agent contained in the ink increases. Due to the aggregation, a size of a dot formed on a printing medium by the ink having a certain volume and jetted from the inkjet head decreases. In addition, the formed dot has a shape, which remains the obscured shape of the ink when the droplet of the ink was hit on the paper with an impact. To form ink dots having dot diameters necessary for recording to have sufficient recording density to form an image, and not to cause white-out lines, therefore, it is necessary to adjust the volume of the jetted ink from the inkjet head to relatively large. Even through such adjustment is performed, strong aggregation forces of the pigment particles to each of which the polymer dispersing agent has been adsorbed reduce the penetration performance of the ink into the paper, to thereby slow the fixing speed of the ink to the printing medium or decrease the abrasion resistance of the resulting recorded image.

For the purpose of enlarging the dot diameter and improving the penetration of the ink into the printing medium to thereby improve the fixing ability, there has been a proposal that a penetrating agent is added to an ink. However, such ink may cause undesirable phenomena for the production of high quality recording images. For example, the dot shape may be degraded (i.e. degradation of the shape surrounding the dot, such as feathering), and the ink may be passed through to the back side of the paper (i.e. back side bleeding). Since the coloring agent penetrates into the inner side of the printing medium, the optical density (OD) of the formed ink dot does not increase though the dot diameter is relatively large.

In the coming future, the application of inkjet printers for business use will be actively developed. In such circumstance, it is expected that there is a demand for further improvement of printing speed with inkjet printer. If the fixing ability of an ink to a recording medium is insufficient in this case, the following problem may occur. For example, when the printed recording mediums are successively discharged from the inkjet printer and successively stacked, a second recording medium discharged following to the previously discharged first recording medium is stacked on the printed surface of the first recording medium before the ink deposited on the printed surface of the first recording medium is fixed to thereby disturb the image formed on the printed surface of the first recording medium, or smear the back side of the second recording medium with the ink of the first recording medium.

Furthermore, there has been a proposal of an ink in which a self-dispersing pigment is used. With this ink, dot diameters can be increased, probably because the aggregation force of the self-dispersible pigment is weaker on the paper than the pigment dispersed in an ink with assistance of the polymer dispersing agent. However, this ink is not still sufficient to resolve the aforementioned problems.

Accordingly, various researches and developments need to be made in a printing method satisfying, at high level, the various elements, which may determine the quality of the resulting recorded images, such as fixing ability of the ink, enlargement of the ink dot diameter, uniformity of the density within the ink dot, and high optical density of the ink dot itself.

For the purpose of further improving printing qualities and image qualities in an inkjet printing technology (e.g. improvements of water resistance or optical density (OD) of an image on a printing medium), there has been a proposal of a method in which an ink and a processing liquid, which reacts with the ink on a printing medium, are applied on the printing medium so that the ink and the processing liquid are reacted. This proposal has been also used in practices. For example, as a method for providing a high quality (e.g. no feathering and no bleeding) print, there is a proposal of a method (see PTL 1) in which a self-dispersible pigment to which anionic atomic groups are bonded, a self-dispersible pigment to which cationic atomic groups are bonded, and a processing liquid are each defined. Another proposal for this is a method (see PTL 2) in which as a coloring agent not containing a surface-based dispersing agent for a black ink, for example, a coloring agent of self-dispersible type, polymer emulsion type, anionic compound, or water-soluble dye is contained in the black ink, and a color ink is specified to contain a coloring agent containing a surfactant-based dispersing agent. Yet another proposal is a method (see PTL 3) in which a black ink is specified to contain a cationic self-dispersible pigment, and a color ink is specified to contain an anionic dye and additives.

However, these methods have problems. For example, aggregations are caused within an ink when colors of inks are mixed on a head water-repellent membrane, to thereby deposit on the water-repellent membrane, and cause jetting failures. Moreover, the ink using the cationic self-dispersible agent has poor stability over time. In the case where the dye is used in the ink, high quality (e.g. no feathering, no bleeding) prints are not easy to obtain compared to the case where the ink containing the pigment is used. Accordingly, it is a current situation that an inkjet recording ink set, which satisfies desirable jetting performance, formation of high quality images, and stability over time, has not yet been provided.

CITATION LIST

Patent Literature

[PTL1] Japanese Patent Application Laid-Open (JP-A) No. 2008-213483
[PTL2] JP-A No. 2008-260926
[PTL3] JP-A No. 2002-265833

SUMMARY OF INVENTION

Technical Problem

The present invention aims at providing an inkjet recording ink set and an ink cartridge, which can realize all of the storage stability, desirable jetting performance and desirable image quality (e.g. no blurring between different colors, and desirable image density) by specifically defining dispersed elements of a black pigment ink, dispersed elements of a color pigment ink, and a dispersing agent. The present invention also aims at providing a recording device, an image forming method, and an image-formed article, all of which uses such ink set.

Solution to Problem

Means for solving the aforementioned problems are as follows:
<1> An inkjet recording ink set, containing:
  a black pigment ink; and
  a color pigment ink,
  wherein the black pigment ink contains a black pigment treated with an anionic surfactant, and a black pigment coated with a resinous polymer, and water, and the black pigment ink is a pigment dispersion liquid where the black pigment treated with the anionic surfactant and the black pigment coated with the resinous polymer are dispersed in the water, and
  wherein the color pigment ink contains a color pigment, a nonionic surfactant, and water, and the color pigment ink is a pigment dispersion liquid where the color pigment is dispersed in the water with assistance of the nonionic surfactant.
<2> The inkjet recording ink set according to <1>, wherein the black pigment ink and the color pigment ink each further contain:
  a resin emulsion;
  a wetting agent; and
  a penetrating agent,
  wherein the penetrating agent contained in the black pigment ink is a polyoxyethylene alkyl ether-based surfactant, and
  wherein the penetrating agent contained in the color pigment ink is a fluorosurfactant.
<3> The inkjet recording ink set according to <2>, wherein the wetting agent contained in the black pigment ink is a combination of 3-methyl-1,3-butanediol and at least one selected from the group consisting of glycerin and trimethylglycine, and
  wherein the wetting agent contained in the color pigment ink is a combination of 1,3-butanediol and at least one selected from the group consisting of glycerin and trimethylglycine.
<4> The inkjet recording ink set according to any of <2> or <3>, wherein the resin emulsion is an emulsion of urethane resin or acryl-styrene resin.
<5> An ink cartridge, containing:
  a cartridge case; and
  the inkjet recording ink set as defined any one of <1> to <4>, housed in the cartridge case.
<6> An inkjet recording device, containing:
  the inkjet recording ink set as defined any one of <1> to <4>; and
  a recording head configured to jet the black pigment ink, the color pigment ink, or both of the black pigment ink and the color pigment ink from the inkjet recording ink set, so as to perform recording.
<7> An image forming method, containing:
  printing an image or characters by means of the inkjet recording device as defined in <6>.
<8> An image-formed article, containing:
  an image support; and
  an image or characters printed on the image support by the image forming method as defined in <7>.
<9> The image-formed article according to <8>, wherein the image support is paper.

Advantageous Effects of Invention

The present invention can provide an inkjet recording ink set and an ink cartridge, which can realize all of the storage stability, desirable jetting performance and desirable image quality (e.g. no blurring between different colors, and desirable image density) by specifically defining dispersed elements of a black pigment ink, dispersed elements of a color pigment ink, and a dispersing agent, as well as providing a recording device, an image forming method, and an image-formed article, all of which uses such ink set.

DESCRIPTION OF EMBODIMENTS

<Inkjet Recording Ink Set>
The present invention will be more specifically explained hereinafter.

The present invention is an inkjet recording ink set, which contains at least: a black pigment ink; and a color pigment ink, wherein the black pigment ink contains a black pigment treated with an anionic surfactant, and a black pigment coated with a resinous polymer, and water, and the black pigment ink is a pigment dispersion liquid where the black pigment treated with the anionic surfactant and the black pigment coated with the resinous polymer are dispersed in the water, and wherein the color pigment ink contains a color pigment, a nonionic surfactant, and water, and the color pigment ink is a pigment dispersion liquid where the color pigment is dispersed in the water with assistance of the nonionic surfactant.

<<Anionic Surfactant>>
The dispersing agent used for the black pigment ink is an anionic surfactant. The anionic surfactant is suitably selected depending on the carbon black for use without any restriction. Examples of the anionic surfactant include: surfactants such as alkyl sulfonate salt, alkylbenzene sulfonate salt, alkylnaphthalene sulfonate salt, a sodium naphthalene sulfonate-formalin condensate, alkane or olefin sulfonate salt, alkyl sulfate, polyoxyethylene alkyl or alkylaryl ether sulfate salt, alkyl phosphate salt, alkyldiphenyl ether disulfonate salt, ether carboxylate, alkyl sulfosuccinate salt, α-sulfofatty acid ester, and fatty acid salt; condensates of higher fatty acid and amino acid; and naphthenate. Among them, aromatic sulfonate salt such as a sodium naphthalene sulfonate-formalin condensate is preferably used as the anionic surfactant, because it provides a desirable dispersibility to the carbon black, and has a suitably foaming property.

The aromatic sulfonate salt is prepared by introducing sulfonic acid into an aromatic compound, and neutralizing the resulting aromatic compound with a basic compound. Examples of the aromatic compound to which the sulfonic acid has been introduced include benzene sulfonic acid, p-toluene sulfonic acid, naphthalene sulfonic acid, and alkylnaphthalene sulfonic acid. Examples of the basic compound include: alkyl amines such as butyl amine, and triethyl amine; alkanolamines such as monoethanolamine, diethanolamine, triethanolamine, and triisopropanolamine; and others such as morpholine, ammonium hydroxide, sodium hydroxide, lithium hydroxide, potassium hydroxide, aminomethyl propanediol, aminoethyl propanediol, and choline. As the basic compound, moreover, a buffer agent such as tris(hydroxylmethyl)aminomethane, and good buffer may be used. Furthermore, a compound (e.g. a sodium naphthalene sulfonate-formalin condensate, etc.) in which the aromatic sulfonate salt is condensed with formalin or the like may be also used as the sulfonate salt-based anionic surfactant. The sodium naphthalene sulfonate-formalin condensate is any condensation product of sodium naphthalene sulfonate and formaldehyde provided that it is formed of a repeat unit of the sodium naphthalene sulfonate-formalin condensate.

<<Resinous Polymer>>

Examples of the resinous polymer include polyamide, polyurethane, polyester, polyurea, epoxy resin, polycarbonate, urea resin, melamine resin, phenol resin, polysaccharides, gelatin, Arabian gum, dextran, casein, protein, natural rubber, carboxy polymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, cellulose acetate, polyethylene, polystyrene, polymer or copolymer of (meth) acrylic acid, polymer or copolymer of (meth)acrylate, (meth) acrylic acid-(meth)acrylate copolymer, styrene-(meth) acrylic acid copolymer, styrene-maleic acid copolymer, sodium alginate, fatty acid, paraffin, bees wax, insect wax, cured beef tallow, carnauba wax, and albumin.

Among them, organic polymers having anionic groups, such as a carboxylic acid group, and a sulfonic acid group can be used. Moreover, a nonionic organic polymer can be used as the resinous polymer, and examples of such nonionic organic polymer include polyvinyl alcohol, polyethyleneglycol monomethacrylate, polypropyleneglycol monomethacrylate, methoxypolyethylene glycol monomethacrylate, polymers or copolymers thereof, and polymer formed by a cationic ring-opening reaction using 2-oxazoline.

<<Nonionic Surfactant>>

The surfactant for used in the color pigment ink is a nonionic surfactant. The nonionic surfactant is suitably selected depending on the organic pigment for use, without any restriction. Examples thereof include: polyoxyethylene alkyl ether such as polyoxyethylene lauryl ether, polyoxyethylene myristyl ether, polyoxyethylene cetyl ether, polyoxyethylene stearin ether, and polyoxyethylene oleyl ether; polyoxyethylene alkylphenyl ether, such as polyoxyethylene octylphenyl ether, and polyoxyethylene nonylphenyl ether; and others such as polyoxyethylene α-naphthyl ether, polyoxyethylene β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and a polyoxyethylene-polyoxypropylene block copolymer.

Any of the aforementioned nonionic surfactants can be used as the dispersing agent for used in the color pigment ink, but the compound expressed by the following general formula 1 is preferably used as such dispersing agent. Use of the compound expressed by the following general formula 1 gives a color pigment ink having a small average particle diameter of the dispersed elements, or a small standard deviation in the particle size distribution of the dispersed elements.

General Formula 1

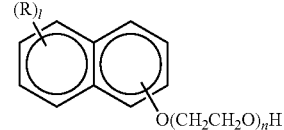

In the general formula 1, R is a C1-20 alkyl group, a C1-20 alkyl group, or a C1-20 aralkyl group, l is an integer of 0 to 7, and n is an integer of 20 to 200.

In the dispersing agent expressed by the general formula 1, n is preferably 20 to 100, more preferably 30 to 50. When n is less than 20, the dispersion stability of the resulting ink tends to be low, and thus the large average particle diameter of the dispersed elements becomes large in the resulting ink, or the standard deviation of the particle size distribution of the dispersed elements is large in the resulting ink, which fails to provide desirable color saturation. When n is larger than 200, the viscosity of the resulting ink increases, which causes difficulties in printing by inkjet. Among the dispersing agents specifically listed above, POE (n=40) β-naphthyl ether where n is 40 is particularly preferable.

<<<Penetrating Agent>>>

The black pigment ink and the color pigment ink contained in the inkjet recording ink set of the present invention each preferably further contain at least a resin emulsion, a wetting agent, and a penetrating agent.

The penetrating agent contained in the black pigment ink is suitably selected depending on the intended purpose without any restriction, but it is preferably a polyoxyethylene alkyl ether-based surfactant. By adding the polyoxyethylene alkyl ether-based surfactant to the ink, a wetting ability of the ink to the paper is increased without adversely affecting the stability of the pigment particles, to thereby providing an image having high coloring performance and less bleeding. The polyoxyethylene alkyl ether-based surfactant is suitably selected depending on the intended purpose without any restriction, and can be selected from commercially available products. Examples of the commercial products thereof include: BT series (manufactured by Nikko Chemicals Co., Ltd.); NONYPOL series (manufactured by Sanyo Chemical Industries, Ltd.); D-series, and P-series (manufactured by Takemoto Oil & Fat Co., Ltd.); and EMALEX DAPE series (manufactured by Nihon-Emulsion Co., Ltd.).

The penetrating agent for use in the color pigment ink is suitably selected depending on the intended purpose without any restriction, but it is preferably a fluorosurfactant. By adding the fluorosurfactant to the ink, a wetting ability of the ink to the paper is increased without adversely affecting the stability of the pigment particles, to thereby providing an image having high coloring performance and less bleeding. The fluorosurfactant is suitably selected depending on the intended purpose without any restriction. Examples thereof include perfluoroalkyl sulfonate, perfluoroalkyl carboxylate, perfluoroalkyl phosphate, a perfluoroalkyl ethylene oxide adduct, perfluoroalkyl betaine, a perfluoroalkylamine oxide compound. Among them, the compounds expressed by the following general formulae 2 to 3 are particularly preferable in view of their reliability.

  General Formula 2

In the general formula 2, m is an integer of 0 to 10, and n is an integer of 0 to 40.

General Formula 3

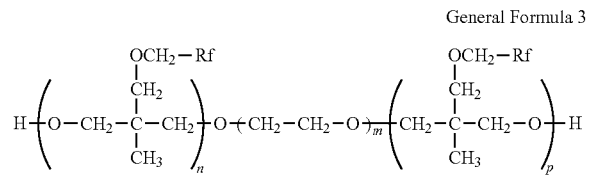

In the general formula 3, Rf is a fluorine-containing group, such as $CF_3$, and $CF_2CF_3$; and m, n and p each independently represent an integer where m is an integer of 6 to 25, n is an integer of 1 to 4, and p is an integer of 1 to 4.

The fluorosurfactant for use may be obtained by appropriately synthesizing, or obtained by selecting from the commercial products.

Examples of the commercial products thereof include: S-144, S-145 (manufactured by Asahi Glass Co., Ltd.); FC-170C, FC-430, FLUORAD-FC4430 (manufactured by Sumitomo 3M Limited); FSO, FSO-100, FSN, FSN-100, FS-300 (manufactured by DuPont); and FT-250, 251 (manufactured by NEOS COMPANY LIMITED). Among them, FSO, FSO-100, FSN, FSN-100, FS-300 manufactured by DuPont are preferable because they can provide the resulting ink with excellent printing quality and storage stability. These nonionic fluorosurfactants may be used independently, or in combination, as the aforementioned fluorosurfactant.

The amount of the penetrating agent in the ink is preferably 0.1% by mass to 10% by mass, more preferably 0.1% by mass to 5% by mass. When the amount of the penetrating agent is less than 0.1% by mass relative to the amount of the ink, the penetrating performance of the resulting ink is not significantly improved. When the amount of the penetrating agent is more than 10% by mass relative to the ink, the viscosity of the resulting ink increases and the dispersed elements of the resulting ink are aggregated, once it is stored at high temperature, and hence the reliability of the resulting ink decreases.

<<<Wetting Agent>>>

The wetting agent for use in the present invention is preferably a wetting agent having a boiling point of 180° C. or higher. When the wetting agent is present in the inkjet recording ink together with trimethylglycine, the ink can secure its moisture retentivity and wetting properties. As a result, no aggregations of the coloring agent contained in the ink is occurred, or the viscosity of the ink does not increase even if the ink is stored for a long period of time, and hence excellent storage stability of the ink can be attained. In addition, even if the ink is left exposed at the edge of a nozzle of an inkjet printer or the like, the ink can maintain its fluidity for a long time in the dried state. Furthermore, use of such ink can realize high jetting stability without causing clogging of a nozzle during printing, or when the printer is restarted after interruption of printing.

The wetting agent for use in the present invention is suitably selected depending on the intended purpose without any restriction. Examples thereof include: polyhydric alcohols such as ethylene glycol, diethylene glycol, 1,3-butanediol, 3-methyl-1,3-butanediol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, and pentanetriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formadmide, N-methylformadmide, and N,N-dimethylformadmide; amines such as monoethanolamine, diethanolamine, triethanolamine, monoethylamine, diethylamine, and triethylamine; sulfur-containing compounds such as dimethyl sulfoxide, sulfolane, and thiodiethanol; and others such as propylene carbonate, and ethylene carbonate. These wetting agents can be used in combination with trimethylglycine. It is preferred that the ink contain at least any of 1,3-butanediol, 3-methyl-1,3-butanediol, diethylene glycol, triethylene glycol, or glycerin among those listed above, because the resulting ink attains excellent effects, such as prevention of clogging caused by the dried ink (i.e. prevention of jetting failures due to evaporation of moisture) and improvements in color saturation of an image formed.

Among those listed above, in the case of the wetting agent for use in the black pigment ink, a combination of 3-methyl-1,3-butanediol and at least one selected from the group consisting of glycerin and trimethylglycine is preferable. In the case of the wetting agent for use in the color pigment ink, a combination of 1,3-butanediol and at least one selected from the group consisting of glycerin and trimethylglycine is preferable.

<<<Resin Emulsion>>>

In the present specification, particles of the resin emulsion means emulsion particles each consisted of a continuous phase of water, and a dispersed phase of a resin component. Examples of the resin component of the dispersed phase include acryl-based resin, vinyl acetate-based resin, styrene-butadiene-based resin, vinyl chloride-based resin, acryl-styrene-based resin, butadiene-based resin, styrene-based resin, crosslinked-acryl resin, crosslinked-styrene-based resin, benzoguanamine resin, phenol resin, silicone resin, epoxy resin, urethane-based resin, paraffin-based resin, and fluororesin. Among them, the acryl-styrene-based resin and urethane-based resin are particularly preferable, because the resulting ink will form an image having excellent water resistance and fixing ability, and the resulting ink has desirable storage stability.

The black pigment ink for the inkjet of the present invention contains a black pigment treated with the aforementioned anionic surfactant, and a black pigment coated with the aforementioned resinous polymer, and water, and the black pigment ink is a pigment dispersion liquid where the black pigment treated with the anionic surfactant and the black pigment coated with the resinous polymer are dispersed in the water. Here, the mixing ratio of the black pigment treated with the anionic surfactant to the black pigment coated with the resinous polymer is preferably 0.3/0.7 to 0.7/0.3 on mass basis.

The color pigment ink for the ink set of the present invention contains a color pigment, the aforementioned nonionic surfactant, and water, and the color pigment ink is a pigment dispersion liquid where the color pigment is dispersed in the water with assistance of the nonionic surfactant.

The physical properties of the inkjet recording ink for use in the present invention are suitably selected depending on the intended purpose without any restriction. For example, the inkjet recording ink preferably has the viscosity, surface tension, pH value and the like in the ranges described below.

After preparing the pigment ink, it is preferred that the prepared ink be subjected to vacuum or pressure filtration using a metal filter or membrane filter, or centrifugal filtration by means of a centrifuge so as to remove coarse particles, foreign matters (e.g. dusts, and dirt), and the like.

<Ink Cartridge, Inkjet Recording Device, Image Forming Method and Image-Formed Article>

The ink cartridge of the present invention contains a cartridge case, and the aforementioned inkjet recording ink set housed in the cartridge case. The inkjet recording device of the present invention contains the aforementioned inkjet recording ink set, and a recording head configured to jet at least either of the black pigment ink or the color pigment ink from the aforementioned inkjet recording ink set so as to perform recording. The image forming method of the present invention contains printing an image or characters using the aforementioned inkjet recording device. The image-formed article of the present invention contains an image support, and an image or characters formed on the image support by the aforementioned image forming method.

The ink cartridge can be formed by housing the pigment ink of the invention, such ink cartridge is mounted on the inkjet recording device, such inkjet recording device form an image on the image support (e.g. a recording material, and a recording medium) by jetting the ink from an orifice to thereby obtain an image-formed article.

Examples of the printing system using the pigment ink of the present invention include a printing system using a printer of an inkjet system (i.e. an inkjet printer) equipped with a recording heat of continuous jetting type or on-demand jetting type. Examples of the on-demand jetting type include a piezo system, a thermal inkjet system, and an electrostatic system.

The formations of the ink cartridge, and inkjet recording device, and the image forming method can be suitably selected from the conventional techniques known in the art, such as those disclosed in JP-A No. 2000-198958.

Moreover, the image support (e.g. the recording material and the recording medium) for used in the present invention may be selected from those absorb an ink composition, such as paper, or those substantially do not absorb the ink composition, and both can be suitably used as the image support for the present invention. Specific example of the image support which can be used in the inkjet recording method for the present invention include: a plastic sheet having a base of polyethylene terephthalate, polycarbonate, polypropylene, polyethylene, polysulfone, ABS resin, polyvinyl chloride, or the like; an image support in which a metal coating is provided on a metal surface such as brass, iron, aluminum, SUS, copper or the like, or a non-metal base by vacuum deposition or the like; an image support having a base of paper which is water-proof processed; and an image support formed of an inorganic material which has been baked at high temperature, i.e. a ceramics material.

Among them, the paper is particularly preferable as the image support as it is economical and provides an image formed thereon with a natural appearance.

EXAMPLES

The present invention will be more specifically explained with reference to examples thereof, hereinafter. However, the examples shall not be construed as limiting to the scope of the present invention. Note that "part(s)" described in the examples means all "part(s) by mass" unless otherwise stated.

At first, the preparation method of the pigments used in examples and comparative examples will be explained hereinafter.

—Anionic Surfactant-Treated Black Pigment—

| <Basic Preparation Method of Pigment α> | |
| --- | --- |
| Carbon black (product name: NIPEX150, manufacturer: Degussa Japan Co., Ltd.) | 200 parts |
| Sodium naphthalene sulfonate-formalin condensate (product name: A-45-PN, manufacturer: Takemoto Oil & Fat Co., Ltd.) | 25 parts |
| Distilled water | Balance |
| | (Total: 1,000 parts) |

The mixture of the above-listed materials was premixed to obtain mixture slurry. The obtained slurry was then circulated and dispersed for 10 minutes by means of a disk-type medium mill (UAM-type, manufactured by Kotobuki Industries Co., Ltd.) using zirconium beads (filling rate: 70%) in the size of 0.015 mm under the conditions such that the peripheral-speed was set at 6 m/s, and the liquid temperature was set at 10° C., followed by subjecting to centrifugal separation by means of a centrifuge (Model-7700, manufactured by Kubota Corporation) to remove coarse particles. The resultant was then subjected to pressure filtration using a polyvinylidene fluoride membrane filter having the average pore diameter of 5.0 μm to thereby obtain Pigment α.

—Resinous Polymer-Coated Black Pigment—
<Basic Preparation Method of Pigment β>

After replacing the inner atmosphere of a 1-L flask equipped with a mechanical stirrer, a thermometer, a nitrogen inlet tube, a condensation tube and dropping funnel with a nitrogen gas, 11.2 g of styrene, 2.8 g of acrylic acid, 12.0 g of lauryl methacrylate, 4.0 g of polyethylene glycol methacrylate, 4.0 g of styrene micromer (AS-6, manufactured by Toagisei Co., Ltd.), and 0.4 g of mercapto ethanol were mixed with 40 g of methylethyl ketone in the flask, and the mixture was heated to 65° C.

Thereafter, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene micromer, 3.6 g of mercapto ethanol, 2.4 g of azobismethyl valeronitrile, and 18 g of methylethyl ketone was dropped into the flask over 2.5 hours. After the dropping was completed, a mixed solution of 0.8 g of azobis methyl valeronitrile, and 18 g of methylethyl ketone was dropped into the flask over 0.5 hours. The resulting mixture in the flask was matured for 1 hour at 65° C., and then 0.8 g of azobismethyl valeronitrile was added, followed by maturing for another 1 hour.

After the completion of the reaction, 364 g of methylethyl ketone was added to the flask, to thereby obtain 800 g of Polymer Solution A having a concentration of 50% by mass. After mixing and sufficiently stirring 28 g of Polymer Solution A, 42 g of C.I. Pigment Black 7, 13.6 g of 1 mol/L potassium hydroxide aqueous solution, 20 g of methylethyl ketone, and 13.6 g of ion-exchanged water, the mixture was kneaded by means of a roll-mill to thereby obtain a paste. The obtained paste was then added to 200 g of pure water, and the mixture was sufficiently stirred. Then, methylethyl ketone and water was removed from the mixture by means of an evaporator, and the resultant was subjected to centrifugal separation by means of a centrifuge (Model-7700, manufactured by Kubota Corporation) to thereby remove coarse particles. Then, the resultant was subjected to pressure filtration using a polyvinylidene fluoride membrane filter having the average pore diameter of 5.0 μm to thereby obtain Pigment β having the pigment content of 15% by mass, and solids content of 20% by mass.

—Nonionic Surfactant-Treated Black Pigment—

<Basic Preparation Method of Pigment γ>

Pigment γ was obtained in the same manner as in the preparation method of Pigment α, provided that the sodium naphthalene sulfonate-formalin condensate used for the formulation of Pigment α was replaced with the compound expressed by the general formula 1 (n=40, product name: prototype, manufacturer: Takemoto Oil & Fat Co., Ltd.).

General Formula 1

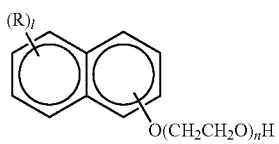

In the general formula 1, R is a C1-20 alkyl group, a C1-20 alkyl group, or a C1-20 aralkyl group; l is an integer of 0 to 7; and n is an integer of 20 to 200.

—Cationic Surfactant-Treated Black Pigment—

<Basic Preparation Method of Pigment δ>

Pigment δ was obtained in the same manner as in the preparation method of Pigment α, provided that the sodium naphthalene sulfonate-formalin condensate used for the formulation of Pigment α was replaced with lauryldimethylbenzylammonium chloride (product name: PIONIN B-231, manufacturer: Takemoto Oil & Fat Co., Ltd.).

—Self-Dispersible Black Pigment—

<Basic Preparation Method of Pigment ε>

To 3,000 mL of a 2.5N sodium sulfate solution, 90 g of carbon black having a CTAB specific surface area of 150 m²/g, and DBP oil-absorption of 100 mL/100 g, and the mixture was stirred at the speed of 300 rpm at the temperature of 60° C., and the mixture was allowed to react for 10 hours to proceed oxidization treatment. The resulted reaction solution was filtered, and the separated carbon black by the filtration was neutralized in a sodium hydroxide solution, followed by being subjected to ultrafiltration. The thus obtained carbon black was washed with water, and then dried. Then, the carbon black was dispersed in pure water so that the dispersion liquid would have the solids content of 20% by mass, and the dispersion solution was sufficiently stirred to thereby obtain Self-Dispersible Black Pigment ε.

—Nonionic Surfactant-Treated Color Pigment—

| <Basic Preparation Method of Pigment ζ> | |
|---|---|
| Monoazo yellow pigment (product name: Fast Yellow 531, manufacturer: Dainichiseika Color & Chemicals Mfg. Co., Ltd.) | 200 parts |
| Polyoxyethylene-β-napthyl ether (product: prototype, manufacturer: Takemoto Oil & Fat Co., Ltd.) | 50 parts |
| Distilled water | Balance |
| | (Total: 1,000 parts) |

The mixture of the above-listed materials was premixed to obtain mixture slurry. The obtained slurry was then circulated and dispersed for 10 minutes by means of a disk-type medium mill (UAM-type, manufactured by Kotobuki Industries Co., Ltd.) using zirconium beads (filling rate: 70%) in the size of 0.015 mm under the conditions such that the peripheral-speed was set at 6 m/s, and the liquid temperature was set at 10° C., followed by subjecting to centrifugal separation by means of a centrifuge (Model-7700, manufactured by Kubota Corporation) to remove coarse particles. The resultant was then subjected to pressure filtration using a polyvinylidene fluoride membrane filter having the average pore diameter of 5.0 μm to thereby obtain Pigment ζ.

—Anionic Surfactant-Treated Color Pigment—

<Basic Preparation Method of Pigment η>

Pigment η was obtained in the same manner as in the preparation method of Pigment ζ, provided that the polyoxyethylene-β-naphthyl ether used for the formulation of Pigment ζ was replaced with a sodium naphthalene sulfonate-formalin condensate.

—Cation Surfactant-Treated Color Pigment—

<Basic Preparation Method of Pigment θ>

Pigment θ was obtained in the same manner as in the preparation method of Pigment ζ, provided that the polyoxyethylene-β-naphthyl ether used for the formulation of Pigment ζ was replaced with lauryldimethylbenzyl ammonium chloride.

Black pigment inks and color pigment inks were prepared using the aforementioned pigments.

The specific resin emulsion, penetrating agent, and wetting agent used together with the pigment, as ink components, and a combination thereof were shown in Tables 1 to 3.

Moreover, the formulation of each ink is shown in Table 4, and combinations of inks (for an ink set) were shown in Table 5.

Note that, in Table 4, the mixing ratio of Black Pigment No. 1 and Black Pigment No. 2 was 1/1 on mass basis.

TABLE 1

| Resin emulsion | Type (product name, manufacturer) |
|---|---|
| a | Urethane resin (XW-75-W920 (prototype), Mitsui Chemicals, Inc.) |
| b | Acryl-styrene resin (J840, BASF Japan Ltd.) |

TABLE 2

| Penetrating agent | Type (product name, manufacturer) |
|---|---|
| Penetrating agent I | Polyoxyethylene alkyl ether-based (PIONIN D-1208, Takemoto Oil & Fat Co.) |
| Penetrating agent II | Polyoxyethylene lauryl ether-based (PIONIN D-1110, Takemoto Oil & Fat Co.) |
| Penetrating agent III | Fluorine-based (PF151N, Omnova Solutions, Inc.) |
| Penetrating agent IV | Silicone-based (KF643, Shin-Etsu Chemical Co., Ltd.) |

TABLE 3

| Combination of wetting agents | Wetting agent 1 | Wetting agent 2 | Wetting agent 3 |
|---|---|---|---|
| Combination 1 | Glycerin | — | 3-methyl-1,3-butanediol |
| Combination 2 | — | Trimethyl glycine | 3-methyl-1,3-butanediol |
| Combination 3 | Glycerin | — | 1,3-butanediol |
| Combination 4 | — | Trimethyl glycine | 1,3-butanediol |
| Combination 5 | Glycerin | Trimethyl glycine | 3-methyl-1,3-butanediol |
| Combination 6 | Glycerin | Trimethyl glycine | 1,3-butanediol |
| Combination 7 | — | — | 3-methyl-1,3-butanediol |
| Combination 8 | Glycerin | Trimethyl glycine | — |
| Combination 9 | — | — | 1,3-butanediol |

TABLE 4

| Ink No. | Black Pigment No. 1 | Black Pigment No. 2 | Color dispersion liquid | Resin emulsion | Combination of wetting agents | Penetrating agent |
|---|---|---|---|---|---|---|
| No. 1 | α | β | — | a | Com. 1 | I |
| No. 2 | — | — | ζ | a | Com. 3 | III |
| No. 3 | α | β | — | b | Com. 2 | I |
| No. 4 | — | — | ζ | b | Com. 4 | III |
| No. 5 | α | β | — | a | Com. 5 | I |
| No. 6 | — | — | ζ | a | Com. 6 | III |
| No. 7 | α | β | — | — | Com. 1 | I |
| No. 8 | — | — | ζ | — | Com. 3 | III |
| No. 9 | α | β | — | b | — | I |
| No. 10 | — | — | ζ | b | — | III |
| No. 11 | α | β | — | a | Com. 1 | — |
| No. 12 | — | — | ζ | a | Com. 3 | — |
| No. 13 | α | β | — | b | Com. 2 | II |
| No. 14 | — | — | ζ | b | Com. 4 | IV |
| No. 15 | α | β | — | a | Com. 7 | I |
| No. 16 | α | β | — | a | Com. 8 | I |
| No. 17 | — | — | ζ | a | Com. 8 | III |
| No. 18 | — | — | ζ | a | Com. 9 | III |
| No. 19 | γ | β | — | a | Com. 1 | I |
| No. 20 | δ | β | — | a | Com. 1 | I |
| No. 21 | α | ε | — | a | Com. 1 | I |
| No. 22 | — | — | η | b | Com. 4 | III |
| No. 23 | — | — | θ | b | Com. 4 | III |

Note that in Table 4 above, "Com." presented therein means "Combination".

Examples 1 to 17 and Comparative Examples 1 to 5

A pigment ink having the following formulation was prepared with the materials shown in Table 4, and stirred for 30 minutes. Then, the ink was filtered through a membrane filter having a pore diameter of 0.8 μm, and subjected to vacuum deairing to thereby obtain an ink set of respective Example and Comparative Example. Table 5 shows a combination of each ink set of Examples 1 to 17 and Comparative Examples 1 to 5.

Formulation of Ink

| | |
|---|---|
| Pigment dispersion liquid (the total solids content: 8% (in the case that the pigment concentration was 20%)) | 40.0 parts |
| Total of wetting agents (see Ink No. above, in the case where there was no wetting agent, 0 part thereof was added) | 30.0 parts |
| 2-ethyl-1,3-hexanediol | 3.0 parts |
| 2-pyrrolidone | 3.0 parts |
| Total of penetrating agents (see Ink No. above, in the case where there was no wetting agent, 0 part thereof was added) | 1.5 parts |
| Resin emulsion | 2.0 parts |
| Distilled water | Balance |
| | (Total: 100 parts) |

TABLE 5

| Example, Comparative Example | Black pigment ink | Color pigment ink |
|---|---|---|
| Example 1 | No. 1 | No. 2 |
| Example 2 | No. 1 | No. 4 |
| Example 3 | No. 3 | No. 2 |
| Example 4 | No. 3 | No. 4 |
| Example 5 | No. 5 | No. 6 |
| Example 6 | No. 7 | No. 2 |
| Example 7 | No. 1 | No. 8 |
| Example 8 | No. 9 | No. 2 |
| Example 9 | No. 1 | No. 10 |
| Example 10 | No. 11 | No. 2 |
| Example 11 | No. 1 | No. 12 |
| Example 12 | No. 13 | No. 2 |
| Example 13 | No. 1 | No. 14 |
| Example 14 | No. 15 | No. 2 |
| Example 15 | No. 16 | No. 2 |
| Example 16 | No. 1 | No. 17 |
| Example 17 | No. 1 | No. 18 |
| Comparative Example 1 | No. 19 | No. 2 |
| Comparative Example 2 | No. 20 | No. 2 |
| Comparative Example 3 | No. 21 | No. 2 |
| Comparative Example 4 | No. 1 | No. 22 |
| Comparative Example 5 | No. 1 | No. 23 |

An ink cartridge was prepared by filling the ink into an ink package for Inkjet Printer IPSiO GX 5000, manufactured by Ricoh Company Limited.

Printing was performed on PPC paper, XEROX4200, manufactured by Fuji Xerox Co., Ltd., and the printed image was measured by means of the Xrite densitometer. Moreover, the ink was also evaluated in terms of jetting stability and storage stability in accordance with the following testing methods. The results of the measurements are shown in Table 6.

Evaluation 1: Blurring Between Different Colors (Blurring at a Boundary Between Black and Color)

The evaluation of the blurring between colors was performed by printing a patter having different colors next each other, and comparing the burred degree at the boundary with the previously determined limitation sample. The results were organoleptically evaluated.

A: Hardly any blurring was observed.

B: Some blurring was observed, but still within the acceptable level.

C: Significant blurring was observed, and beyond the acceptable level.

Evaluation 2: Image Evaluation

An image density of a solid image portion of the sample image was measured by means of the Xrite densitometer.

~Density of Black Solid Image~
  A: 1.30 or more
  B: 1.20 or more, but less than 1.30
  C: Less than 1.20

~Density of Color Solid Image~
  A: 0.80 or more
  B: 0.70 or more, but less than 0.80
  C: Less than 0.70

Evaluation 3: Jetting Stability

The printer was placed in a constant temperature and humidity oven, and the inner atmosphere of the oven was set at the temperature of 32° C. and humidity of 30% RH. Under such conditions, the print pattern chart described below was successively printed on 20 pieces of paper, and then rested for 20 minutes without performing any printing. This process was performed for 50 times, and hence printing was performed on 1,000 pieces of paper in total. Thereafter, the nozzle plate of the printer was observed under a microscope, and examined whether or not there was any deposition of the ink on the nozzle plate.

—Print Pattern Chart—

As a printing pattern, a chart having 5% of printing area of each color with respect to the printing area of the entire image portion was used. The printing was performed at 100% duty for each ink. Note that, in this printing, the recording density was 300 dpi, and a one-pass printing system was applied.

A: No deposition was observed adjacent to the nozzle.

B: A slight deposition was observed adjacent to the nozzle.

C: Depositions were observed adjacent to the nozzle.

Evaluation 4: Storage Stability of Ink

Each ink was independently placed in a polyethylene container, and the container was sealed. Under such condition, the ink was stored for 3 weeks at 70° C. After the storage, the particle diameter, surface tension, and viscosity of the ink was measured, and the rate of changes thereof compared to the initial properties of the ink was evaluated as follows.

A: 10% or less
B: 30% or less
C: More than 50%

TABLE 6

| | Blurring between colors | Image evaluation | | Jetting stability | | Ink storage stability | |
|---|---|---|---|---|---|---|---|
| | | black | color | black | color | black | Color |
| Ex. 1 | A | A | A | A | A | A | A |
| Ex. 2 | A | A | A | A | A | A | A |
| Ex. 3 | A | A | A | A | A | A | A |
| Ex. 4 | A | A | A | A | A | A | A |
| Ex. 5 | A | A | A | A | A | A | A |
| Ex. 6 | B | B | A | A | A | B | A |
| Ex. 7 | B | A | B | A | A | A | B |
| Ex. 8 | A | B | A | B | A | A | A |
| Ex. 9 | A | A | B | A | B | A | A |
| Ex. 10 | B | B | A | A | A | A | A |
| Ex. 11 | B | A | B | A | A | A | A |
| Ex. 12 | B | B | A | A | A | A | A |
| Ex. 13 | B | A | A | A | B | A | B |
| Ex. 14 | A | A | A | B | A | B | A |
| Ex. 15 | B | A | A | A | A | A | A |
| Ex. 16 | A | A | A | A | B | A | B |
| Ex. 17 | B | A | A | A | A | A | A |
| Comp. Ex. 1 | B | B | A | C | A | C | A |
| Comp. Ex. 2 | A | A | A | C | A | C | A |
| Comp. Ex. 3 | A | B | A | B | A | C | A |
| Comp. Ex. 4 | B | A | B | A | C | A | C |
| Comp. Ex. 5 | B | A | B | A | C | A | C |

The results above shows that, by specifically defining dispersed elements of a black pigment ink, dispersed elements of a color pigment ink, and a dispersing agent, there can be provided an inkjet recording ink set and ink cartridge, which can realize all of the storage stability, desirable jetting performance and desirable image quality (e.g. no blurring between different colors, and desirable image density) as well as a recording device, an image forming method, and an image-formed article using such ink set.

The invention claimed is:

1. An inkjet recording ink set, comprising:
   a black pigment ink; and
   a color pigment ink,
   wherein the black pigment ink is a pigment dispersion liquid comprising a black pigment treated with an anionic surfactant and a black pigment coated with a resinous polymer, both dispersed in water,
   wherein the color pigment ink is a pigment dispersion liquid comprising a color pigment dispersed in water with a nonionic surfactant,
   wherein the black pigment ink and the color pigment ink each further comprise:
   a resin emulsion;
   a wetting agent; and
   a penetrating agent,
   wherein the penetrating agent in the black pigment ink is a polyoxyethylene alkyl ether-based surfactant, and
   wherein the penetrating agent in the color pigment ink is a fluorosurfactant.

2. The inkjet recording ink set according to claim 1, wherein the wetting agent in the black pigment ink comprises 3-methyl-1,3-butanediol and at least one selected from the group consisting of glycerin and trimethylglycine, and
   wherein the wetting agent in the color pigment ink comprises 1,3-butanediol and at least one selected from the group consisting of glycerin and trimethylglycine.

3. The inkjet recording ink set of claim 2, wherein the resin emulsion in the black pigment ink, the color pigment ink, or both is an emulsion of urethane resin or acryl-styrene resin.

4. The inkjet recording ink set of claim 1, wherein the resin emulsion in the black pigment ink, the color pigment ink, or both is an emulsion of urethane resin or acryl-styrene resin.

5. The inkjet recording ink set of claim 1, wherein the resin emulsion in the black pigment ink is an emulsion of urethane resin or acryl-styrene resin.

6. The inkjet recording ink set of claim 1, wherein the resin emulsion in the color pigment ink is an emulsion of urethane resin or acryl-styrene resin.

7. The inkjet recording ink set of claim 1, wherein the anionic surfactant is an aromatic sulfonate salt.

8. The inkjet recording ink set of claim 1, wherein an amount of the penetrating agent in the ink is from 0.1% by mass to 10% by mass.

9. The inkjet recording ink set of claim 1, wherein a boiling point of the wetting agent is 180° C. or higher.

10. The inkjet recording ink set of claim 1, wherein a mixing ratio, by mass, of the black pigment treated with the anionic surfactant to the black pigment coated with the resinous polymer is from 0.3/0.7 to 0.7/0.3.

11. An inkjet recording ink set, comprising:
a black pigment ink; and
a color pigment ink,
wherein the black pigment ink is a pigment dispersion liquid comprising a black pigment treated with an anionic surfactant and a black pigment coated with a resinous polymer, both dispersed in water,
wherein the color pigment ink is a pigment dispersion liquid comprising a color pigment dispersed in water with a nonionic surfactant, and
wherein the nonionic surfactant comprises a nonionic surfactant of formula (1):

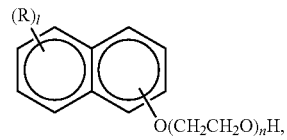

Formula (1)

wherein R is a C1-20 alkyl group, a C1-20 allyl group, or a C1-20 aralkyl group, $l$ is an integer of from 0 to 7, and $n$ is an integer of from 20 to 200.

12. The inkjet recording ink set of claim 11, wherein the anionic surfactant is an aromatic sulfonate salt.

13. The inkjet recording ink set of claim 11, wherein a mixing ratio, by mass, of the black pigment treated with the anionic surfactant to the black pigment coated with the resinous polymer is from 0.3/0.7 to 0.7/0.3.

* * * * *